US012763675B2

(12) United States Patent
Yi et al.

(10) Patent No.: US 12,763,675 B2
(45) Date of Patent: Oct. 13, 2026

(54) POWER CONVERSION CIRCUIT AND ELECTRONIC DEVICE

(71) Applicant: Huawei Digital Power Technologies Co., Ltd., Shenzhen (CN)

(72) Inventors: Liqiong Yi, Shenzhen (CN); Zezhou Yang, Dongguan (CN); Dibin Zhou, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 177 days.

(21) Appl. No.: 18/768,559

(22) Filed: Jul. 10, 2024

(65) Prior Publication Data

US 2024/0364212 A1 Oct. 31, 2024

Related U.S. Application Data

(63) Continuation of application No. PCT/CN2022/072805, filed on Jan. 19, 2022.

(51) Int. Cl.

| | |
|---|---|
| ***H02M 1/42*** | (2007.01) |
| ***H02M 1/00*** | (2006.01) |
| ***H02M 3/00*** | (2006.01) |

(52) U.S. Cl.

CPC ......... *H02M 1/4241* (2013.01); *H02M 1/007* (2021.05); *H02M 1/4216* (2013.01); *H02M 3/003* (2021.05); *H02M 3/01* (2021.05)

(58) Field of Classification Search

CPC .... H02M 1/4241; H02M 1/007; H02M 3/003; H02M 3/01; H02M 1/4216

See application file for complete search history.

(56) References Cited

U.S. PATENT DOCUMENTS

| | | | | |
|---|---|---|---|---|
| 11,088,625 B1 * | 8/2021 | Cao | H02M 3/33584 | |
| 2010/0182803 A1 * | 7/2010 | Nan | H02M 3/33592 | 363/21.02 |
| 2020/0321878 A1 * | 10/2020 | Zhang | H02M 7/4811 | |
| 2021/0155100 A1 | 5/2021 | Khaligh et al. | | |
| 2021/0408927 A1 * | 12/2021 | Zhang | H02M 3/33592 | |
| 2022/0085725 A1 * | 3/2022 | Kolar | H02M 3/33573 | |
| 2023/0009358 A1 * | 1/2023 | Li | H02M 3/33573 | |

FOREIGN PATENT DOCUMENTS

| | | |
|---|---|---|
| CN | 103595367 A | 2/2014 |
| CN | 106469984 A | 3/2017 |
| CN | 106469985 A | 3/2017 |
| EP | 3787169 A1 | 3/2021 |

* cited by examiner

*Primary Examiner* — Rafael O De Leon Domenech

(74) *Attorney, Agent, or Firm* — Maier & Maier, PLLC

(57) ABSTRACT

A power conversion circuit and an electronic device. After circuit units that each are in a resonant circuit of the power conversion circuit, and that each include a resonant capacitor and/or a resonant inductor, are connected in series in a triangle connection. When it can be ensured that the circuit units connected in series in the triangle connection and the circuit units connected in series in a star connection relationship provide a same resonant frequency, a capacitance value of the resonant capacitor is reduced, and/or current stress of the resonant capacitor and/or current stress of the resonant inductor are/is reduced.

20 Claims, 8 Drawing Sheets

POWER CONVERSION CIRCUIT AND ELECTRONIC DEVICE

CROSS-REFERENCE TO RELATED APPLICATIONS

This application is a continuation of International Application No. PCT/CN2022/072805, filed on Jan. 19, 2022, which is hereby incorporated by reference in its entirety.

TECHNICAL FIELD

The embodiments relate to the field of electrical technologies, a power conversion circuit and an electronic device.

BACKGROUND

A power conversion circuit is a conversion circuit widely used in an electronic device and may perform voltage conversion on a direct current to obtain a voltage required by a subsequent device, to drive a load in the electronic device.

In the conventional technology, the power conversion circuit includes a switch conversion circuit, three resonant circuits with interleaved phases, a three-phase transformer, a rectifier circuit, and a filter circuit. A direct current input by the switch conversion circuit is converted into three alternating currents with interleaved phases of 120 degrees. The three resonant circuits are used as an excitation source that provides a resonance. The three-phase transformer performs voltage conversion on the three alternating currents. Finally, the rectifier circuit converts the three alternating currents into a direct current, and the direct current is filtered by the filter circuit, and then output to a load for power supply.

An inductance value of a resonant inductor that provides a resonance and a capacitance value of a resonant capacitor that provides the resonance cannot be set to be excessively small, to ensure a resonant frequency of a resonant tank. However, when the inductance value of the resonant inductor is set to a large value, a loss and a volume of the resonant inductor increase. When the capacitance value of the resonant capacitor is set to a large value, a volume of the resonant capacitor increases. This increases occupation of the resonant circuit on the power conversion circuit and limited space in the electronic device in which the power conversion circuit is located and increases production costs of the power conversion circuit. Therefore, how to reduce the capacitance value of the resonant capacitor and/or the inductance value of the resonant inductor of the resonant circuit in the voltage power conversion circuit is a problem to be urgently resolved in this field.

SUMMARY

The embodiments provide a power conversion circuit and an electronic device, to reduce a capacitance value of a resonant capacitor and/or an inductance value of a resonant inductor in the power conversion circuit and overcome problems that a device in a resonant circuit occupies space and production costs are increased.

A first aspect provides a power conversion circuit, including a switch conversion circuit, three resonant circuits, a three-phase transformer, a rectifier circuit, and a filter circuit that are sequentially connected. The three resonant circuits are separately disposed between the switch conversion circuit and the three-phase transformer. The three resonant circuits each include a resonant capacitor, a resonant inductor, and an excitation inductor.

The excitation inductor and the resonant capacitor in each resonant circuit are connected in series to form a first circuit unit, and three first circuit units in the three resonant circuits are connected in series. The resonant capacitor, the resonant inductor, and the excitation inductor in each resonant circuit are connected in series to form a second circuit unit, and three second circuit units in the three resonant circuits are connected in series. The resonant inductor and the excitation inductor in each resonant circuit are connected in series to form a third circuit unit, and three third circuit units in the three resonant circuits are connected in series. The resonant capacitor and the resonant inductor in each resonant circuit are connected in series to form a fourth circuit unit, and three fourth circuit units in the three resonant circuits are connected in series. Alternatively, the resonant inductors in the three resonant circuits are connected in series.

After the circuit units that each include the resonant capacitor and/or the resonant inductor and that are in the foregoing resonant circuits are connected in series, these circuit units in the resonant circuits can be converted from a star connection relationship to a triangle connection relationship. Therefore, for any one resonant circuit in the three resonant circuits, through star-triangle conversion, resonant capacitors and/or resonant inductors that are in the triangle connection relationship and that are in the other two resonant circuits can jointly provide a resonance for the resonant circuit together with the resonant capacitor and/or the resonant inductor in the resonant circuit. Therefore, when the three resonant circuits in the triangle connection relationship and the three resonant circuits in the star connection relationship provide a same resonant frequency, a capacitance value of the resonant capacitor in each resonant circuit may be set to be smaller and/or an inductance value of the resonant inductor in each resonant circuit may be set to be smaller. In addition, a resonant capacitor with a smaller capacitance value and/or a resonant inductor with a smaller inductance value in the three resonant circuits can equivalently provide a resonant frequency that can be provided by the resonant capacitor and/or the resonant inductor in one of the original three resonant circuits in a star connection. In this way, without affecting resonance effect, the capacitance value of the resonant capacitor in each resonant circuit is reduced, and/or the inductance value of the resonant inductor in each resonant circuit can be reduced. Therefore, current stress of the resonant capacitor and/or the resonant inductor in the resonant circuit is reduced, and/or occupation of the resonant capacitor and the resonant inductor on the power conversion circuit and limited space in the electronic device in which the power conversion circuit is located. This can reduce production costs of the power conversion circuit and the electronic device in which the power conversion circuit is located, when it is ensured that the power conversion circuit normally implements a function.

In some embodiments, the three resonant circuits may include a first resonant circuit, a second resonant circuit, and a third resonant circuit. The first resonant circuit includes a first resonant capacitor, a first resonant inductor, and a first excitation inductor that are connected in series. The second resonant circuit includes a second resonant capacitor, a second resonant inductor, and a second excitation inductor that are connected in series. The third resonant circuit includes a third resonant capacitor, a third resonant inductor, and a third excitation inductor that are connected in series.

With reference to the embodiments, the following describes a connection relationship between the resonant capacitor, the resonant inductor, and the excitation inductor in each of the three resonant circuits, and a triangle connection relationship between the circuit units in the three resonant circuits.

In Embodiment 1 of the first aspect, the first excitation inductor and the first resonant capacitor that are connected in series in the first resonant circuit are denoted as a first circuit unit a. The second excitation inductor and the second resonant capacitor that are connected in series in the second resonant circuit are denoted as a first circuit unit b. The third excitation inductor and the third resonant capacitor that are connected in series in the third resonant circuit are denoted as a first circuit unit c. The first circuit unit a, the first circuit unit b, and the first circuit unit c are connected in series, so that excitation inductors and resonant capacitors in the three resonant circuits jointly form the triangle connection relationship. Therefore, in the power conversion circuit in which three resonant capacitors and three excitation inductors are connected in a triangle connection manner provided in this embodiment, for any one resonant circuit in the three resonant circuits, the resonant capacitors that are in the triangle connection relationship in the other two resonant circuits may be enabled to jointly provide the resonance for the one resonant circuit together with the resonant capacitor in the one resonant circuit. Therefore, when the capacitance value of the resonant capacitor is set to be smaller, the resonant capacitor in the three resonant circuits may equivalently provide the resonant frequency that can be provided by the resonant capacitor in one of the three resonant circuits in the star connection. In this way, without affecting the resonance effect, the capacitance value of the resonant capacitor in each resonant circuit can be reduced, the current stress of the resonant capacitor and the excitation inductor in the resonant circuit is reduced, and occupation of the resonant capacitor on the power conversion circuit and limited space in the electronic device in which the power conversion circuit is located is reduced. This can reduce production costs of the power conversion circuit and the electronic device in which the power conversion circuit is located, when it is ensured that the power conversion circuit normally implements the function.

In Embodiment 2 of the first aspect, the first resonant capacitor, the first resonant inductor, and the first excitation inductor that are connected in series in the first resonant circuit are denoted as a second circuit unit a. The second resonant capacitor, the second resonant inductor, and the second excitation inductor that are connected in series in the second resonant circuit are denoted as a second circuit unit b. The third resonant capacitor, the third resonant inductor, and the third excitation inductor that are connected in series in the third resonant circuit are denoted as a second circuit unit c. The second circuit unit a, the second circuit unit b, and the second circuit unit c are connected in series, so that the resonant capacitors, resonant inductors, and the excitation inductors in the three resonant circuits jointly form the triangle connection relationship. Therefore, in the power conversion circuit in which the three resonant capacitors, three resonant inductors, and the three excitation inductors are connected in the triangle connection manner provided in this embodiment, for any one resonant circuit in the three resonant circuits, the resonant capacitors and the resonant inductors that are in the triangle connection relationship in the other two resonant circuits may be enabled to jointly provide the resonance for the one resonant circuit together with the resonant capacitor and the resonant inductor in the one resonant circuit. Therefore, when the capacitance value of the resonant capacitor is smaller, the inductance value of the resonant inductor is smaller, and the current stress of the resonant inductor, the resonant capacitor, and the excitation inductor in each resonant circuit is smaller, the resonant capacitor and the resonant inductor in the three resonant circuits may equivalently provide the resonant frequency that can be provided by the resonant capacitor and the resonant inductor in one of the three resonant circuits in the star connection. Then, a conduction loss of the resonant circuit can be reduced when it is ensured that the power conversion circuit normally implements the function. In addition, when the capacitance value of the resonant capacitor is set to be smaller, the occupation of the resonant capacitor on the power conversion circuit and the limited space in the electronic device in which the power conversion circuit is located can be reduced. This can reduce production costs of the power conversion circuit and the electronic device in which the power conversion circuit is located, when it is ensured that the power conversion circuit normally implements the function.

In Embodiment 3 of the first aspect, the first resonant inductor and the first excitation inductor that are connected in series in the first resonant circuit are denoted as a third circuit unit a. The second resonant inductor and the second excitation inductor that are connected in series in the second resonant circuit are denoted as a third circuit unit b. The third resonant inductor and the third excitation inductor that are connected in series in the third resonant circuit are denoted as a third circuit unit c. The third circuit unit a, the third circuit unit b, and the third circuit unit c are connected in series, so that the resonant inductors and the excitation inductors in the three resonant circuits jointly form the triangle connection relationship. Therefore, in the power conversion circuit in which three resonant inductors and three excitation inductors are connected in the triangle connection manner provided in this embodiment, for any one resonant circuit in the three resonant circuits, the resonant inductors that are in the triangle connection relationship in the other two resonant circuits may be enabled to jointly provide the resonance for the one resonant circuit together with the resonant inductor in the one resonant circuit. Therefore, the current stress of the resonant inductor and the excitation inductor in each resonant circuit can be reduced, and the conduction loss of the resonant circuit can be reduced when it is ensured that the power conversion circuit normally implements the function.

In Embodiment 4 of the first aspect, the first resonant capacitor and the first resonant inductor that are connected in series in the first resonant circuit are denoted as a fourth circuit unit a. The second resonant capacitor and the second resonant inductor that are connected in series in the second resonant circuit are denoted as a fourth circuit unit b. The third resonant capacitor and the third resonant inductor that are connected in series in the third resonant circuit are denoted as a fourth circuit unit c. The fourth circuit unit a, the fourth circuit unit b, and the fourth circuit unit c are connected in series, so that the resonant capacitors and the resonant inductors in the three resonant circuits jointly form the triangle connection relationship. Therefore, in the power conversion circuit in which the three resonant capacitors and three resonant inductors are connected in the triangle connection manner provided in this embodiment, for any one resonant circuit in the three resonant circuits, the resonant capacitors and the resonant inductors that are in the triangle connection relationship in the other two resonant circuits may be enabled to jointly provide the resonance for the one resonant circuit together with the resonant capacitor and the resonant inductor in the one resonant circuit. Therefore, when the capacitance value of the resonant capacitor is smaller, and the inductance value of the resonant inductor is smaller, the resonant capacitor and the resonant inductor in the three resonant circuits may equivalently provide the resonant frequency that can be provided by the resonant capacitor and the resonant inductor in one of the three resonant circuits in the star connection. In addition, the current stress of the resonant capacitor and the resonant inductor in each resonant circuit in the resonant circuit is reduced, and the conduction loss of the resonant circuit is reduced. In addition, when the capacitance value of the resonant capacitor is set to be smaller, the occupation of the resonant capacitor on the power conversion circuit and the limited space in the electronic device in which the power conversion circuit is located is reduced. This can reduce production costs of the power conversion circuit and the electronic device in which the power conversion circuit is located, when it is ensured that the power conversion circuit normally implements the function.

In Embodiment 5 of the first aspect, the first resonant inductor in the first resonant circuit, the second resonant inductor in the second resonant circuit, the third resonant inductor in the third resonant circuit are connected in series, so that the resonant inductors in the three resonant circuits jointly form the triangle connection relationship. Therefore, in the power conversion circuit in which three resonant inductors are connected in the triangle connection manner provided in this embodiment, for any one resonant circuit in the three resonant circuits, the resonant inductors that are in the triangle connection relationship in the other two resonant circuits may be enabled to jointly provide the resonance for the one resonant circuit together with the resonant inductor in the one resonant circuit. Therefore, the current stress, in each resonant circuit, of the resonant inductor in the resonant circuit can be reduced, and the conduction loss of the resonant circuit can be reduced when it is ensured that the power conversion circuit normally implements the function.

In an embodiment of the first aspect, capacitance values of the first resonant capacitor, the second resonant capacitor, and the third resonant capacitor are equal; inductance values of the first resonant inductor, the second resonant inductor, and the third resonant inductor are equal; and capacitance values of the first excitation inductor, the second excitation inductor, and the third excitation inductor are equal.

A second aspect provides an electronic device. The electronic device includes a rectifier module, a filter module, a PFC module, and a power conversion module that are sequentially connected. The power conversion module includes the power conversion circuit provided in any one of implementations of the first aspect. The rectifier module is configured to rectify an alternating current input into the electronic device to obtain a direct current. Then, the filter module filters the direct current, and the PFC module performs power factor correction on the direct current. Further, the power conversion module performs voltage conversion on the direct current and outputs the direct current. In an embodiment of the second aspect, the electronic device includes a rectifier, a charging pile, and a communication device. Therefore, in the resonant circuit of the power conversion circuit of the electronic device, when the circuit units including the resonant capacitor and/or the resonant inductor are connected in series to form the triangle connection relationship, the occupation of the resonant capacitor and/or the resonant inductor on the limited space in the electronic device. This can reduce production costs of the electronic device when the electronic device having the power conversion circuit can normally implement the function.

DETAILED DESCRIPTION OF EMBODIMENTS

Figure 1A:
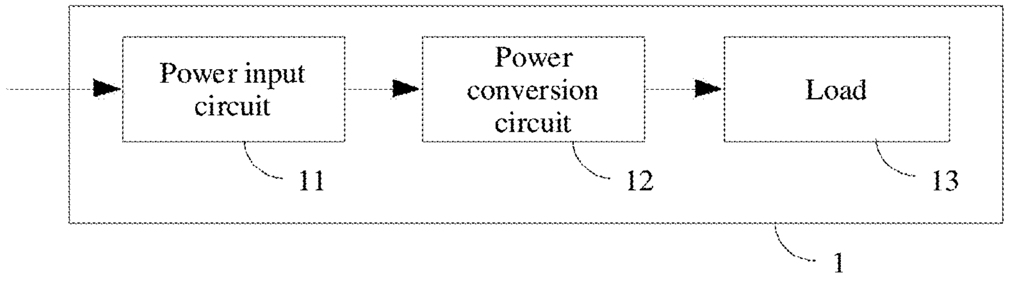
FIG. 1A is a schematic diagram of an application scenario.
Figure 1B:
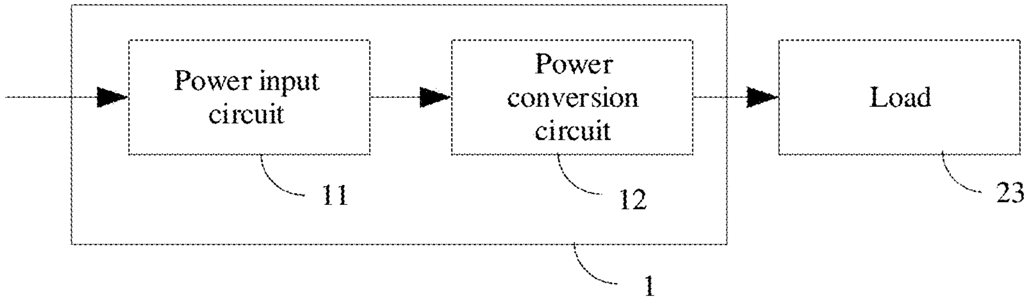
FIG. 1B is a schematic diagram of another application scenario.

FIG. 1A is a schematic diagram of an application scenario. As shown in FIG. 1A and FIG. 1B, the embodiments may be applied to an electronic device 1 that includes a load 13. The electronic device 1 further includes a power input circuit 11 and a power conversion circuit 12, to supply power to the load 13. The power input circuit 11 is configured to perform processing such as rectification and filtering on an input alternating current to obtain a direct current. The power conversion circuit 12 is configured to perform voltage conversion on the direct current to obtain a direct current corresponding to a working parameter of the load 13, and then supplies power to the load 13, so as to drive the load 13 to work. For example, the electronic device 1 may be a communication device or the like. The power input circuit 11 and the power conversion circuit 12 may be used as power circuits in the communication device to supply power to the load 13 such as a processor or a transceiver in the communication device after converting the input alternating current into the direct current.

Figure 2:
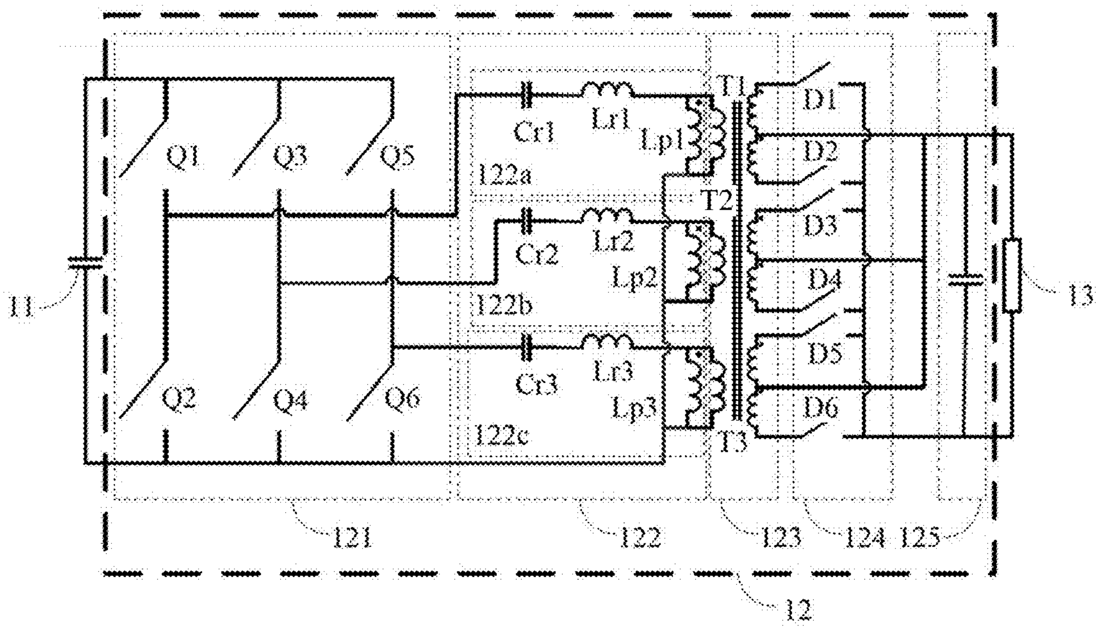
FIG. 2 is a schematic diagram of a circuit structure of a power conversion circuit.

FIG. 1B is a schematic diagram of another application scenario. As shown in FIG. 2, the embodiments may be applied to the electronic device 1 that supplies power to a load 23. For example, the electronic device 1 may be a charging pile or the like of an electric vehicle. In this case, a battery of the electric vehicle may be used as the load 23.

The power input circuit 11 and the power conversion circuit 12 in the electronic device 1 may charge the battery of the electric vehicle after converting an external alternating current into a direct current required by the electric vehicle. Alternatively, the electronic device 1 may be a rectifier, process an obtained alternating current to obtain a direct current, and supply power to another device that is used as the load 23.

FIG. 2 is a schematic diagram of a circuit structure of a power conversion circuit. For example, the power conversion circuit 12 is used in the electronic device 1 shown in FIG. 1A. The power conversion circuit 12 shown in FIG. 2 includes: a switch conversion circuit 121, three resonant circuits 122, a three-phase transformer 123, a rectifier circuit 124, and a filter circuit 125. The switch conversion circuit 121, the three resonant circuits 122, the three-phase transformer 123, the rectifier circuit 124, and the filter circuit 125 are sequentially connected from left to right in FIG. 2.

One end of the switch conversion circuit 121 is connected to the power input circuit 11, and the other end of the switch conversion circuit 121 is connected to the three resonant circuits 122. The switch conversion circuit 121 may include three bridge arms, which are denoted as a first bridge arm, a second bridge arm, and a third bridge arm arranged in a sequence from left to right in a circuit diagram shown in FIG. 2. The first bridge arm includes switches Q1 and Q2, the second bridge arm includes switches Q3 and Q4, and the third bridge arm includes switches Q5 and Q6. Each bridge arm may convert a direct current from the power input circuit 11 into an alternating current. In addition, phases of three alternating currents output from the first bridge arm, the second bridge arm, and the third bridge arm are all different, and are set to be interlaced with each other at 120 degrees. For example, the phases of the three alternating currents may be 0 degrees, 120 degrees, 240 degrees, or the like. In some embodiments, the switches Q1 to Q6 each may be a metal-oxide-semiconductor field-effect transistor (MOS), an insulated gate bipolar transistor (IGBT), or the like.

One end of each of the three resonant circuits 122 is connected to the switch conversion circuit 121, and the other end of each of the three resonant circuits 122 is connected to the three-phase transformer 123. In the circuit diagram shown in FIG. 2, the three resonant circuits 122 are denoted as a first resonant circuit 122*a*, a second resonant circuit 122*b*, and a third resonant circuit 122*c* that are arranged in a sequence from top to bottom. The first resonant circuit 122*a* includes a first resonant capacitor Cr1, a first resonant inductor Lr1, and a first excitation inductor Lp1 that are connected in series. The second resonant circuit 122*b* includes a second resonant capacitor Cr2, a second resonant inductor Lr2, and a second excitation inductor Lp2 that are connected in series. The third resonant circuit 122*c* includes a third resonant capacitor Cr3, a third resonant inductor Lr3, and a third excitation inductor Lp3 that are connected in series.

The three-phase transformer 123 includes three primary windings. In the circuit diagram shown in FIG. 2, the three primary windings of the three-phase transformer are denoted as a first primary winding T1, a second primary winding T2, and a third primary winding T3 that are arranged in a sequence from top to bottom. Each primary winding corresponds to two secondary windings. The first primary winding T1 is connected to the first resonant circuit 122*a*, the second primary winding T2 is connected to the second resonant circuit 122*b*, and the third primary winding T3 is connected to the third resonant circuit 122*c*.

The rectifier circuit 124 includes three rectifier units. In the circuit diagram shown in FIG. 2, the three rectifier units are denoted as a first rectifier unit, a second rectifier unit, and a third rectifier unit that are arranged in a sequence from top to bottom. The first rectifier unit includes: switches D1 and D2, which are respectively connected to two secondary windings corresponding to the first primary winding T1. The second rectifier unit includes: switches D3 and D4, which are respectively connected to two secondary windings corresponding to the second primary winding T2. The third rectifier unit includes: switches D5 and D6, which are connected to two secondary windings corresponding to the third primary winding T3. The three rectifier units are configured to convert three-phase alternating currents with interleaved phases of 120 degrees at a secondary side of the three-phase transformer into a direct current, to supply power to the load 13. In some embodiments, the switches D1 to D6 may be diodes. The filter circuit 125 is disposed between the rectifier circuit 124 and the load 13 and is configured to filter out a harmonic component of the direct current supplied to the load.

When the switches Q1 to Q6 of the switch conversion circuit of the power conversion circuit 12 shown in FIG. 2 are turned on at different moments, the switch conversion circuit 121 may convert a direct current input voltage into the three alternating currents. After the three alternating currents each pass through one resonant circuit in the three resonant circuits 122 to provide a resonance, the three-phase transformer 123 performs voltage conversion on the three alternating currents, the three alternating currents are processed by the rectifier circuit 124 and the filter circuit 125, and then a direct current is output to supply power to the load 13. In an entire process, the power conversion circuit 12 may perform voltage conversion on a direct current obtained by the power conversion circuit 12, and output the direct current obtained after the voltage conversion to the load 13, thereby implementing a function of performing the voltage conversion on the direct current.

Figure 3:
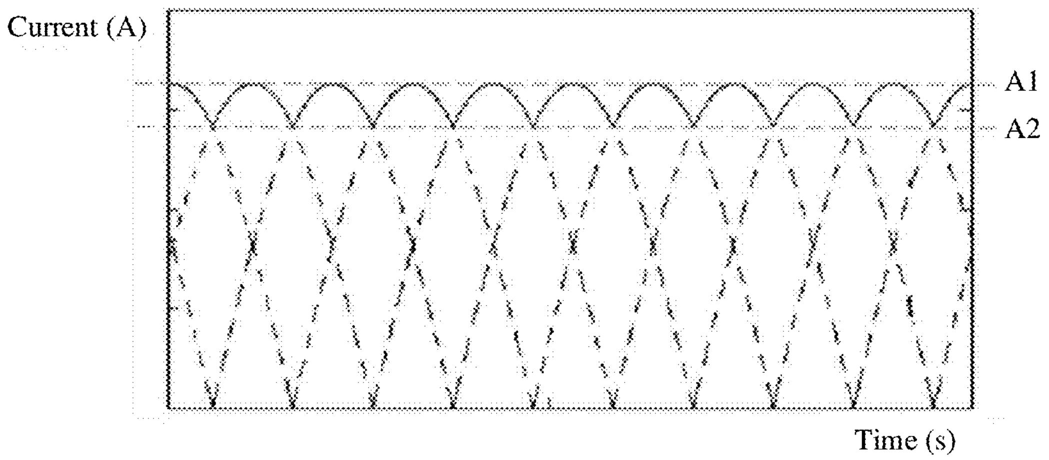
FIG. 3 is a schematic diagram of a current of a direct current output by a power conversion circuit.

FIG. 3 is a schematic diagram of a current of the direct current output by the power conversion circuit and is a schematic diagram of a current (A) of the direct current output by the power conversion circuit 12 to the load 13 shown in FIG. 2. A current waveform of the direct current output by the power conversion circuit 12 is a result of "superimposition" of currents of the three alternating currents and can vary within a small range of A1 to A2. There is a small ripple current.

Figure 4:
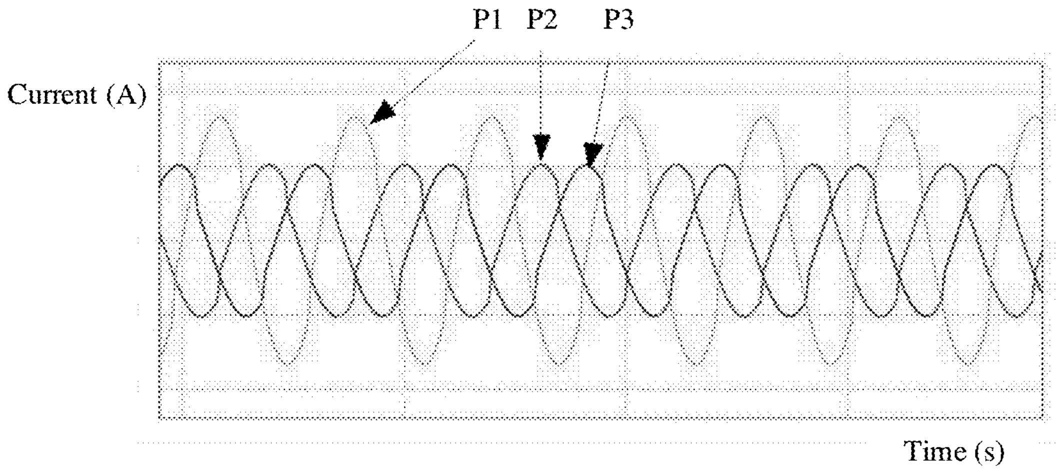
FIG. 4 is a schematic diagram of currents of three alternating currents output by a power conversion circuit.

However, FIG. 4 is a schematic diagram of currents of the three alternating currents output by the power conversion circuit and is a schematic diagram of a current of the alternating current output by each resonant circuit in the power conversion circuit 12 shown in FIG. 2. The schematic diagram shows a problem of inter-phase current imbalance that may be caused by a capacitance difference of resonance parameters between three resonant circuits in the power conversion circuit 12. For example, a current waveform of the first resonant circuit 122*a* in the power conversion circuit 12 is denoted as P1, a current waveform of the second resonant circuit 122*b* is denoted as P2, and a current waveform of the third resonant circuit 122*c* is denoted as P3. In FIG. 4, a deviation 5% of the resonant inductor of the first resonant circuit 122*a* is used as an example. In this case, the deviation of the resonant inductor of the first resonant circuit 122*a* may cause a large deviation in an output current value when the waveform P1 of the first resonant circuit is compared with the waveform P2 of the second resonant circuit and the waveform P1 of the first resonant circuit is compared with the waveform P3 of the third resonant circuit, resulting in current imbalance of the three alternating currents.

Figure 5:
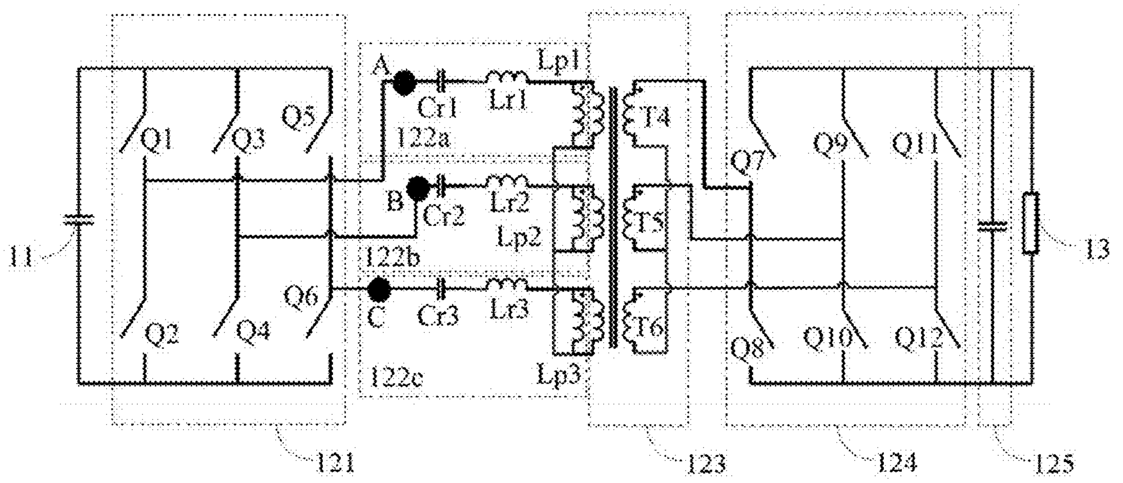
FIG. 5 is a schematic diagram of another circuit structure of a power conversion circuit.

FIG. 5 is a schematic diagram of another circuit structure of the power conversion circuit. Based on the power conversion circuit 12 shown in FIG. 2, in the power conversion circuit 12 shown in FIG. 5, excitation inductors in the three resonant circuits 122 are connected in a "Y" form, to resolve the problem of the current imbalance shown in FIG. 4 that presents in the power conversion circuit 12 shown in FIG. 2, and the connection in the "Y" form may also be referred to as a star connection or the like. As shown in FIG. 5, one end of the first excitation inductor Lp1 in the first resonant circuit 122*a*, one end of the second excitation inductor Lp2 in the second resonant circuit 122*b*, and one end of the third excitation inductor Lp3 in the third resonant circuit 122*c* are connected together. Because a neutral point at which the end of the first excitation inductor Lp1, the end of the second excitation inductor Lp2, and the end of the third excitation inductor Lp3 are connected together is not grounded, natural current sharing of the current may be formed between the three resonant circuits 122. This overcomes the problem of the current imbalance shown in FIG. 4 that presents in the alternating currents output by the three resonant circuits in the power conversion circuit 12 shown in FIG. 2.

In the power conversion circuit shown in FIG. 5, the rectifier circuit 12 includes three rectifier units. A first rectifier unit includes: switches Q7 and Q8, which are connected to one secondary winding corresponding to the first primary winding T1. A second rectifier unit includes: switches Q9 and Q10, which are connected to one secondary winding corresponding to the second primary winding T2. A third rectifier unit includes: switches Q11 and Q12, which are connected to one secondary winding corresponding to the third primary winding T3. In some embodiments, the switches Q7 to Q12 may be MOS transistors. The switches Q7 to Q12 may be turned on at different moments, to supply power to the load 13 after three alternating currents at a secondary side of a three-phase transformer are converted into a direct current.

Three secondary windings T4, T5, and T6 of the three-phase transformer 123 of the power conversion circuit shown in FIG. 5 may also be connected in series in a "Y" form. An implementation of the secondary winding of the three-phase transformer 123 is not limited.

Figure 6:
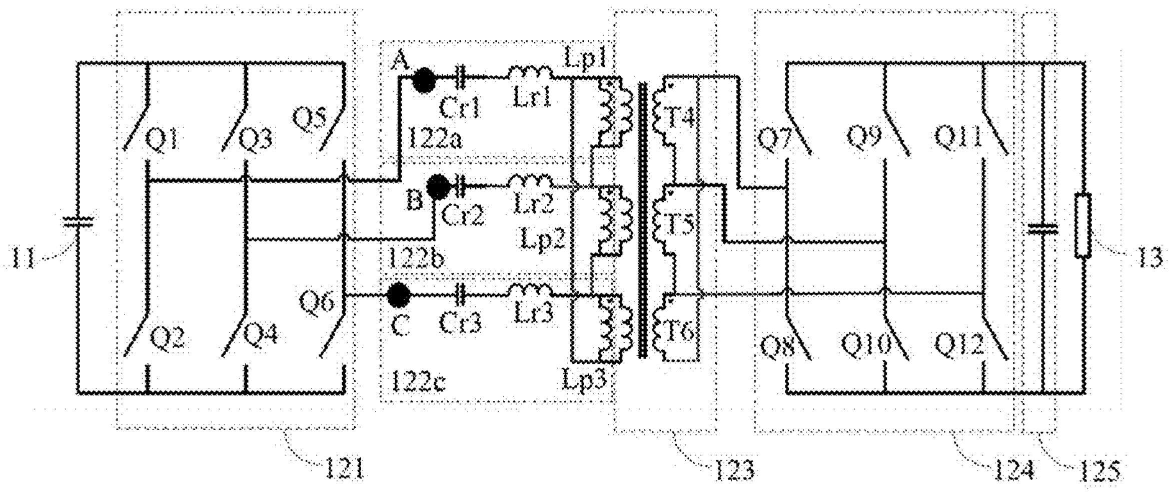
FIG. 6 is a schematic diagram of still another circuit structure of a power conversion circuit.

FIG. 6 is a schematic diagram of still another circuit structure of the power conversion circuit. Based on the power conversion circuit shown in FIG. 2, in the power conversion circuit shown in FIG. 6, excitation inductors in the three resonant circuits 122 are connected in a "delta" form, which is alternatively referred to as a triangle connection or the like. As shown in FIG. 6, a second end of the first excitation inductor Lp1 in the first resonant circuit 122*a* is connected to a first end of the second excitation inductor Lp2 in the second resonant circuit 122*b*. A second end of the second excitation inductor Lp2 is connected to a first end of the third excitation inductor Lp3 in the third resonant circuit 122*c*. A second end of the third excitation inductor Lp3 is connected to a first end of the first inductor Lp1. Similarly, excitation inductors in the three resonant circuits 122 may be connected in series, to implement current sharing between alternating currents output by the three resonant circuits 122.

However, in the power conversion circuit 12 shown in FIG. 5 and FIG. 6, although a problem of inter-phase current imbalance caused by a difference of parameters between the resonant circuits 122 is overcome, an inductance value of a resonant inductor that provides a resonance and a capacitance value of a resonant capacitor that provides the resonance cannot be set excessively large, to ensure a resonant frequency provided by a resonant circuit. However, when the capacitance value of the resonant capacitor disposed in the power conversion circuit 12 is large, a loss of the resonant capacitor is increased and a volume of the resonant capacitor is increased. When the inductance value of the resonant inductor disposed in the power conversion circuit 12 is large, a volume of the resonant inductor in the circuit may be increased. For an overall angle of the power conversion circuit 12 and the electronic device 1 in which the power conversion circuit 12 is located, if the set capacitance value of the resonant capacitor is large, occupation of these devices on the power conversion circuit 12 and limited space in the electronic device 1 in which the power conversion circuit 12 is located is further increased. This affects use effect of the power conversion circuit 12 and increases production costs of the power conversion circuit 12 and the electronic device 1 in which the power conversion circuit 12 is located.

Therefore, the embodiments may further provide a power conversion circuit and an electronic device, to resolve the foregoing problem. The following describes the embodiments. The following embodiments may be combined with each other, and same or similar concepts or processes may not be described in some embodiments again.

Figure 7:
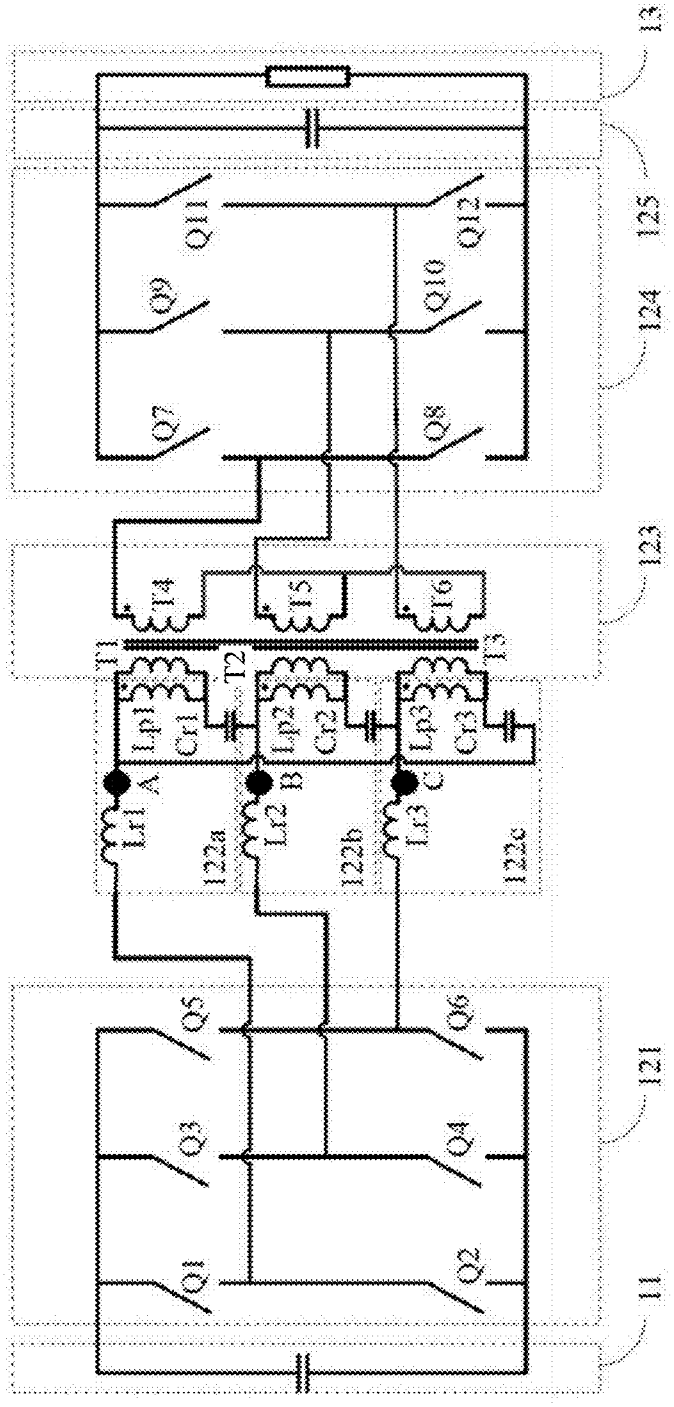
FIG. 7 is a schematic diagram of a structure of Embodiment 1 of a power conversion circuit.

FIG. 7 is a schematic diagram of a structure of Embodiment 1 of a power conversion circuit. The power conversion circuit shown in FIG. 7 may be used in the electronic device 1 shown in FIG. 1A and FIGS. 1B and 1*s* disposed between the power input circuit 11 and the load 13. The power conversion circuit shown in FIG. 7 includes: the switch conversion circuit 121, the three resonant circuits 122, the three-phase transformer 123, the rectifier circuit 124, and the filter circuit 125. The switch conversion circuit 121, the three resonant circuits 122, the three-phase transformer 123, the rectifier circuit 124, and the filter circuit 125 are sequentially connected. Structures and working principles of the switch conversion circuit 121, the three-phase transformer 123, the rectifier circuit 124, and the filter circuit 125 are similar to those of the power conversion circuit shown in FIG. 2, and details are not described again.

In the power conversion circuit shown in FIG. 7, each resonant circuit 122 includes a resonant inductor, an excitation inductor, and a resonant capacitor that are connected in series. The first resonant circuit 122*a* includes the first resonant inductor Lr1, the first excitation inductor Lp1, and the first resonant capacitor Cr1 that are connected in series. The second resonant circuit 122*b* includes the second resonant inductor Lr2, the second excitation inductor Lp2, and the second resonant capacitor Cr2 that are connected in series. The third resonant circuit 122*c* includes the third resonant inductor Lr3, the third excitation inductor Lp3, and the third resonant capacitor Cr3 that are connected in series.

Further, in the power conversion circuit shown in FIG. 7, the first excitation inductor Lp1 and the first resonant capacitor Cr1 that are connected in series in the first resonant circuit 122*a* are denoted as a first circuit unit a. The second excitation inductor Lp2 and the second resonant capacitor Cr2 that are connected in series in the second resonant circuit 122*b* are denoted as a first circuit unit b. The third excitation inductor Lp3 and the third resonant capacitor Cr3 that are connected in series in the third resonant circuit 122*c* are denoted as a first circuit unit c. The first circuit unit a, the first circuit unit b, and the first circuit unit c are connected in series, so that excitation inductors and resonant capacitors in three resonant circuits jointly form a triangle connection relationship.

Figure 8:
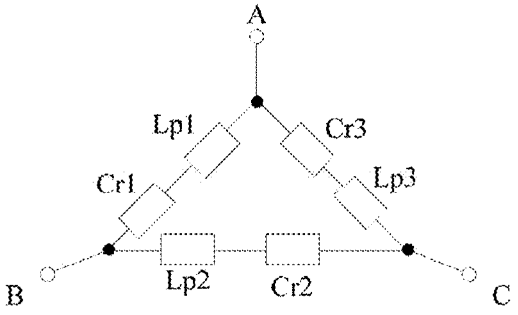
FIG. 8 is a schematic diagram of a triangle connection relationship of Embodiment 1 of a power conversion circuit.

FIG. 8 is a schematic diagram of the triangle connection relationship of Embodiment 1 of the power conversion circuit. With reference to FIG. 7 and FIG. 8, in FIG. 7, a right end of the first resonant inductor Lr1 is denoted as a point A, a right end of the second resonant inductor Lr2 is denoted as a point B, and a right end of the third resonant inductor Lr3 is denoted as a point C. In this case, among the point A, the point B, and the point C shown in FIG. 8, the first excitation inductor Lp1 and the first resonant capacitor Cr, the second excitation inductor Lp2 and the second resonant capacitor Cr2, and the third excitation inductor Lp3 and the third resonant capacitor Cr3 form the triangle connection relationship. In the power conversion circuit shown in FIG. 7, when capacitance values of three resonant capacitors are the same, inductance values of three resonant inductors are the same, and inductance values of three excitation inductors are the same in three resonant circuits, the capacitance value of the resonant capacitor is denoted as C1, and the inductance value of the resonant inductor is denoted as L1. A resonant frequency fr implemented by each resonant circuit may be calculated according to formula 1.

$$fr = \frac{1}{2\pi\sqrt{C1 * L1}} \quad \text{Formula 1}$$

Figure 9:
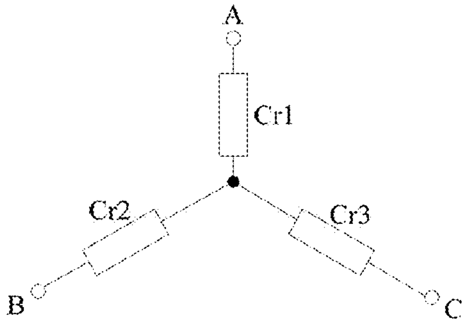
FIG. 9 is a schematic diagram of a circuit structure in which a resonant capacitor in a resonant circuit is in a Y connection relationship.

For comparison, FIG. 9 is a schematic diagram of a circuit structure in which a resonant capacitor in a resonant circuit is in a Y connection relationship. FIG. 9 shows the Y connection relationship that is formed after same ends of the three resonant capacitors Cr1, Cr2, and Cr3 are connected, among the point A, the point B, and the point C of the three resonant circuits in the power conversion circuit 12 shown in FIG. 5 and FIG. 6. When the circuit structure shown in FIG. 9 and the circuit structure shown in FIG. 8 are separately connected to an external circuit through nodes A, B, and C, and internal features are the same, equivalent conversion (briefly referred to as star-triangle conversion) may be performed between circuit structures shown in FIG. 9 and FIG. 8. In the circuit structure shown in FIG. 9, a capacitance value of the resonant capacitor is denoted as C2, and an inductance value of the resonant inductor is denoted as L2. When each resonant circuit implements a resonant frequency fr that is the same as the resonant frequency fr in formula 1, the resonant frequency fr may be calculated according to formula 2.

$$fr = \frac{1}{2\pi\sqrt{C2 * L2}} \quad \text{Formula 2}$$

Therefore, it can be understood from formula 1 and formula 2 that in the power conversion circuit 12 shown in FIG. 7, after the first resonant capacitor Cr1, the second resonant capacitor Cr2, and the third resonant capacitor Cr3 in the three resonant circuits 122 are connected in the triangle connection relationship shown in FIG. 8, because the three resonant capacitors are connected in series in a triangle connection manner, the same resonant frequency fr may be implemented when the capacitance value is reduced to one third of the capacitance value of the resonant capacitor C2 in FIG. 9. In this case, C2=3C1, and an equivalent conversion relationship is shown in formula 3.

$$fr = \frac{1}{2\pi\sqrt{C2 * L2}} = \frac{1}{2\pi\sqrt{3 * C1 * L1}} \quad \text{Formula 3}$$

Therefore, in an implementation process, when the resonant circuit in the power conversion circuit shown in FIG. 7 and the resonant circuit in the power conversion circuit shown in FIG. 5 and FIG. 6 provide a same resonant frequency fr, the capacitance value of the resonant capacitor in the resonant circuit may be reduced. For example, when a capacitance value C2 of the resonant capacitor in FIG. 5 and FIG. 6 is reduced to obtain the capacitance value C1 of the resonant capacitor in FIG. 7, the same resonant frequency fr may still be implemented by connecting the three resonant capacitors in the triangle connection manner.

TABLE 1

| Power conversion circuit | Voltage of a resonant capacitor Cr | Root mean square current of a resonant inductor Lr | Root mean square switch current of a switching circuit | Root mean square current of a resonant tank | Root mean square current of a transformer primary winding | Root mean square current of a transformer secondary winding | Root mean square switch current of a rectifier circuit |
|---|---|---|---|---|---|---|---|
| FIG. 5 | $V_{cr}$ | $\frac{\sqrt{2}\pi}{6N}I_0$ | $\frac{\pi}{6N}I_0$ | $\frac{\sqrt{2}\pi}{6N}I_0$ | $\frac{\sqrt{2}\pi}{6N}I_0$ | $\frac{\sqrt{2}\pi}{6}I_0$ | $\frac{\pi}{6}I_0$ |
| FIG. 6 | $V_{cr}$ | $\frac{\sqrt{2}\pi}{6N}I_0$ | $\frac{\pi}{6N}I_0$ | $\frac{\sqrt{2}\pi}{6N}I_0$ | $\frac{\sqrt{2}\pi}{6\sqrt{3}N}I_0$ | $\frac{\sqrt{2}\pi}{6\sqrt{3}}I_0$ | $\frac{\pi}{6}I_0$ |
| FIG. 7 | $\sqrt{3}V_{cr}$ | $\frac{\sqrt{2}\pi}{6N}I_0$ | $\frac{\pi}{6N}I_0$ | $\frac{\sqrt{2}\pi}{6N}I_0$ | $\frac{\sqrt{2}\pi}{6\sqrt{3}N}I_0$ | $\frac{\sqrt{2}\pi}{6\sqrt{3}}I_0$ | $\frac{\pi}{6}I_0$ |

Table 1 shows comparison between circuit parameters of the power conversion circuit shown in FIG. 5, FIG. 6, and FIG. 7. It can be understood that, in the resonant circuit of the power conversion circuit provided in the embodiment shown in FIG. 7, voltage stress of each resonant capacitor increases to $\sqrt{3}$ times voltage stress of the resonant capacitor in FIG. 5 and FIG. 6, but current stress of each resonant capacitor decreases to $$\frac{1}{\sqrt{3}}$$

times current stress of the resonant capacitor in FIG. 5 and FIG. 6.

In conclusion, after first circuit units in the three resonant circuits are connected in series, the capacitance value of the resonant capacitor is small, so that when the resonant circuit in the power conversion circuit shown in FIG. 7 and the resonant circuit in the power conversion circuit shown in FIG. 5 and FIG. 6 provide a same resonant frequency, as compared with the resonant capacitor in the power conversion circuit shown in FIG. 5 and FIG. 6, the capacitance value of the resonant capacitor of the power conversion circuit shown in FIG. 7 can be set to be small (the capacitance value of the resonant capacitor in FIG. 7 may be one third of the capacitance value of the resonant capacitor in FIG. 5 and FIG. 6), to reduce the current stress of the resonant capacitor of each resonant circuit in the resonant circuit, and further improve an overheating phenomenon when the resonant capacitor works. In addition, because a capacity of a capacitor is positively correlated with a volume, the volume of the resonant capacitor may be further reduced when the capacitance value of the resonant capacitor in the resonant circuit is reduced, and occupation of the resonant capacitor on the power conversion circuit and limited space in the electronic device in which the power conversion circuit is located is reduced. This can reduce production costs of the power conversion circuit and the electronic device in which the power conversion circuit is located, when it is ensured that the power conversion circuit normally implements a function.

It should be noted that, the structure of the power conversion circuit 12 provided in FIG. 7 is merely an example. Another form of LLC triangle connection or star connection in the power conversion circuit 12 may be used, for example, resonant inductors Lr are connected in the triangle connection manner, and a proper topology may be selected based on different application scenarios and requirements, for example, a form in FIG. 11 to FIG. 14. However, topology conversion is not limited to the following several solutions, and other solutions are not listed one by one herein.

Figure 10:
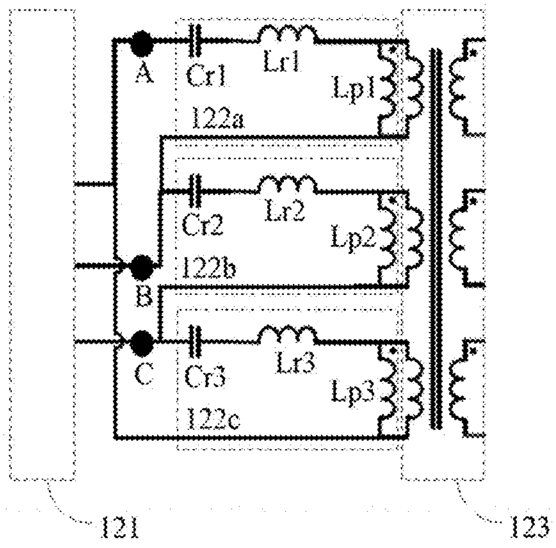
FIG. 10 is a schematic diagram of a structure of Embodiment 2 of a power conversion circuit.

FIG. 10 is a schematic diagram of a structure of Embodiment 2 of a power conversion circuit. FIG. 10 shows an implementation of each of the three resonant circuits 122 in another power conversion circuit. Each resonant circuit shown in FIG. 10 includes a resonant capacitor, a resonant inductor, and an excitation inductor that are connected in series. The first resonant capacitor Cr1, the first resonant inductor Lr1, and the first excitation inductor Lp1 that are connected in series in the first resonant circuit 122*a* are denoted as a second circuit unit a. The second resonant capacitor Cr2, the second resonant inductor Lr2, and the second excitation inductor Lp2 that are connected in series in the second resonant circuit 122*b* are denoted as a second circuit unit b. The third resonant capacitor Cr3, the third resonant inductor Lr3, and the third excitation inductor Lp3 that are connected in series in the third resonant circuit 122*c* are denoted as a second circuit unit c. The second circuit unit a, the second circuit unit b, and the second circuit unit c are connected in series, so that resonant capacitors, resonant inductors, and excitation inductors in the three resonant circuits jointly form a triangle connection relationship. The three resonant circuits shown in FIG. 10 may be used to perform equivalent replacement on three resonant circuits in the power conversion circuit shown in FIG. 7. In a power conversion circuit obtained through replacement, implementations and principles of a switch conversion circuit, a three-phase transformer, a rectifier circuit, and a filter circuit are the same as those shown in FIG. 7. Details are not described again.

Figure 11:
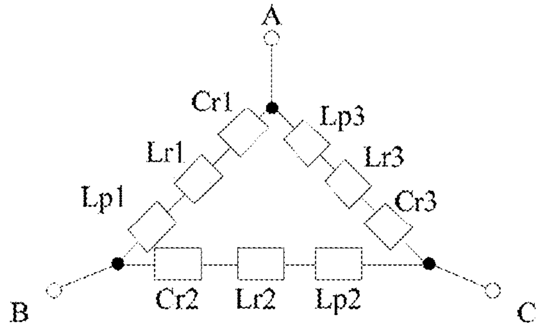
FIG. 11 is a schematic diagram of a triangle connection relationship of Embodiment 2 of a power conversion circuit.

FIG. 11 is a schematic diagram of the triangle connection relationship of Embodiment 2 of the power conversion circuit. With reference to FIG. 10 and FIG. 11, in FIG. 10, a left side of the first resonant capacitor Cr1 is denoted as a point A, a left side of the second resonant capacitor Cr2 is denoted as a point B, and a left side of the third resonant capacitor Cr3 is denoted as a point C. In this case, the first resonant capacitor Cr1, the first resonant inductor Lr1 and the first excitation inductor Lp1, the second resonant capacitor Cr2, the second resonant inductor Lr2 and the second excitation inductor Lp2, the third resonant capacitor Cr3, and the third resonant inductor Lr3 and the third excitation inductor Lp3 are connected in series to form the triangle connection relationship among the point A, the point B, and the point C.

Therefore, when a resonant circuit in the power conversion circuit shown in FIG. 10 is implemented, after resonant capacitors and resonant inductors in three resonant circuits are connected in a triangle connection manner in FIG. 11, when it is ensured that the resonant circuit shown in FIG. 10 and the resonant circuit shown in FIG. 5 or FIG. 6 provide a same resonant frequency, through star-triangle conversion, a capacitance value of the resonant capacitor of the resonant circuit in FIG. 10 is reduced to one third of that in FIG. 5 or FIG. 6, and current stress of the resonant capacitor, the resonant inductor, and the excitation inductor is reduced to $$\frac{1}{\sqrt{3}}$$

of that in FIG. 5 or FIG. 6. In this way, a conduction loss of the resonant circuit can be reduced when it is ensured that the power conversion circuit normally implements a function. In addition, when the capacitance value of the resonant capacitor is set to be smaller, occupation of the resonant capacitor on the power conversion circuit and limited space in an electronic device in which the power conversion circuit is located is reduced. This can reduce production costs of the power conversion circuit and the electronic device in which the power conversion circuit is located, when it is ensured that the power conversion circuit normally implements the function.

Figure 12:
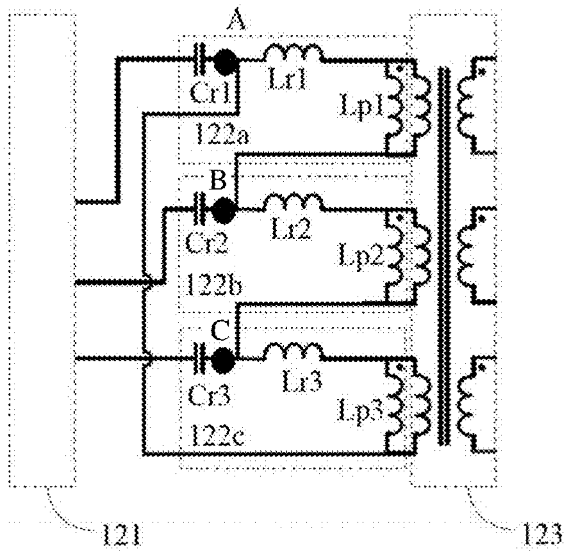
FIG. 12 is a schematic diagram of a structure of Embodiment 3 of a power conversion circuit.

FIG. 12 is a schematic diagram of a structure of Embodiment 3 of a power conversion circuit. FIG. 12 shows an implementation of three resonant circuits in another power conversion circuit. Each resonant circuit shown in FIG. 12 includes a resonant capacitor, a resonant inductor, and an excitation inductor that are connected in series. The first resonant inductor Lr1 and the first excitation inductor Lp1 that are connected in series in the first resonant circuit 122*a* are denoted as a third circuit unit a. The second resonant inductor Lr2 and the second excitation inductor Lp2 that are connected in series in the second resonant circuit 122*b* are denoted as a third circuit unit b. The third resonant inductor Lr3 and the third excitation inductor Lp3 that are connected in series in the third resonant circuit 122*c* are denoted as a third circuit unit c. The third circuit unit a, the third circuit unit b, and the third circuit unit c are connected in series, so that resonant inductors and excitation inductors in the three resonant circuits jointly form a triangle connection relationship. The three resonant circuits shown in FIG. 12 may be used to perform equivalent replacement on three resonant circuits in the power conversion circuit shown in FIG. 7. In a power conversion circuit obtained through replacement, implementations and principles of a switch conversion circuit, a three-phase transformer, a rectifier circuit, and a filter circuit are the same as those shown in FIG. 7. Details are not described again.

Figure 13:
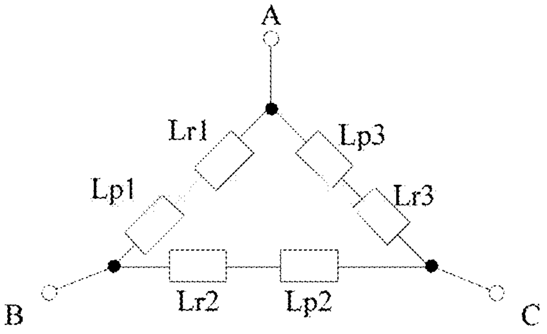
FIG. 13 is a schematic diagram of a triangle connection relationship of Embodiment 3 of a power conversion circuit.

FIG. 13 is a schematic diagram of the triangle connection relationship of Embodiment 3 of the power conversion circuit. With reference to FIG. 12 and FIG. 13, in FIG. 12, a right side of the first resonant capacitor Cr1 is denoted as a point A, a right side of the second resonant capacitor Cr2 is denoted as a point B, and a right side of the third resonant capacitor Cr3 is denoted as a point C. In this case, the first resonant inductor Lr1 and the first excitation inductor Lp1, the second resonant inductor Lr2 and the second excitation inductor Lp2, and the third resonant inductor Lr3 and the third excitation inductor Lp3 are connected in series to form the triangle connection relationship among the point A, the point B, and the point C.

Therefore, when a resonant circuit in the power conversion circuit shown in FIG. 12 is implemented, after the resonant inductors in the three resonant circuits are connected in a triangle connection manner in FIG. 13, when it is ensured that the resonant circuit shown in FIG. 12 and the resonant circuit shown in FIG. 5 or FIG. 6 provide a same resonant frequency, for any one resonant circuit of the three resonant circuits through star-triangle conversion, the resonant inductors that are in the triangle connection relationship in the other two resonant circuits may be enabled to jointly provide a resonance for the resonant circuit together with the resonant inductor in the resonant circuit. Therefore, current stress of the resonant inductor and the excitation inductor in each resonant circuit in FIG. 10 can be reduced to $$\frac{1}{\sqrt{3}}$$

of that in FIG. 5 or FIG. 6 when the resonant inductor and the excitation inductor in each resonant circuit provide the resonance. In this way, a conduction loss of the resonant circuit can be reduced when it is ensured that the power conversion circuit normally implements a function.

Figure 14:
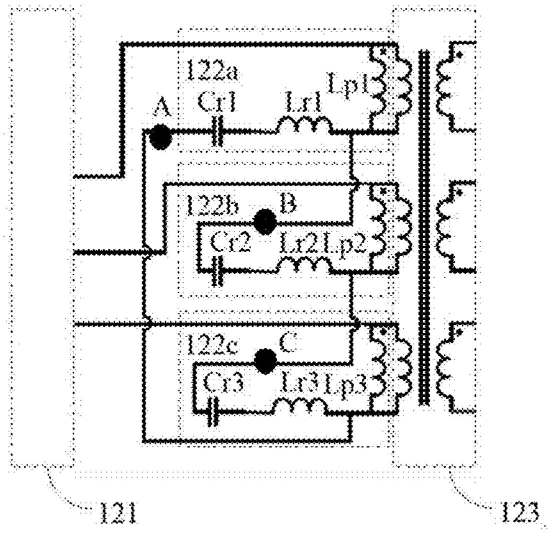
FIG. 14 is a schematic diagram of a structure of Embodiment 4 of a power conversion circuit.

FIG. 14 is a schematic diagram of a structure of Embodiment 4 of a power conversion circuit. FIG. 14 shows an implementation of three resonant circuits in another power conversion circuit. Each resonant circuit shown in FIG. 14 includes a resonant inductor, an excitation inductor, and a resonant capacitor that are connected in series. The first resonant capacitor Cr1 and the first resonant inductor Lr1 that are connected in series in the first resonant circuit 122*a* are denoted as a fourth circuit unit a. The second resonant capacitor Cr2 and the second resonant inductor Lr2 that are connected in series in the second resonant circuit 122*b* are denoted as a fourth circuit unit b. The third resonant capacitor Cr3 and the third resonant inductor Lr3 that are connected in series in the third resonant circuit 122*c* are denoted as a fourth circuit unit c. The fourth circuit unit a, the fourth circuit unit b, and the fourth circuit unit c are connected in series, so that resonant capacitors and resonant inductors in the three resonant circuits jointly form a triangle connection relationship. The three resonant circuits shown in FIG. 14 may be used to perform equivalent replacement on three resonant circuits in the power conversion circuit shown in FIG. 7. In a power conversion circuit obtained through replacement, implementations and principles of a switch conversion circuit, a three-phase transformer, a rectifier circuit, and a filter circuit are the same as those shown in FIG. 7. Details are not described again.

Figure 15:
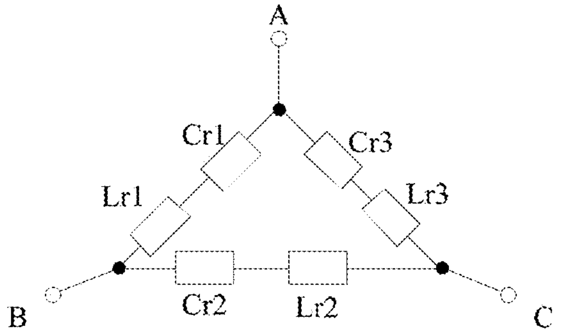
FIG. 15 is a schematic diagram of a triangle connection of Embodiment 4 of a power conversion circuit.

FIG. 15 is a schematic diagram of a triangle connection of Embodiment 4 of the power conversion circuit. With reference to FIG. 14 and FIG. 15, in FIG. 14, a left side of the first resonant capacitor Cr1 is denoted as a point A, a left side of the second resonant capacitor Cr2 is denoted as a point B, and a left side of the third resonant capacitor Cr3 is denoted as a point C. In this case, the first resonant capacitor Cr1 and the first resonant inductor Lr1, the second resonant capacitor Cr2 and the second resonant inductor Lr2, and the third resonant capacitor Cr3 and the third resonant inductor Lr3 are connected in series to form the triangle connection relationship among the point A, the point B, and the point C.

Therefore, when a resonant circuit in the power conversion circuit shown in FIG. 14 is implemented, after resonant capacitors and resonant inductors in three resonant circuits are connected in a triangle connection manner in FIG. 15, when it is ensured that the resonant circuit shown in FIG. 14 and a resonant circuit in the power conversion circuit shown in FIG. 5 or FIG. 6 provide a same resonant frequency, through star-triangle conversion, a capacitance value of the resonant capacitor in FIG. 14 is reduced to one third of that in FIG. 5 or FIG. 6, and current stress of the resonant capacitor and the resonant inductor in each resonant circuit is reduced to $$\frac{1}{\sqrt{3}}$$

of that in FIG. 5 or FIG. 6 when the resonant capacitor and the resonant inductor in each resonant circuit provide a resonance. In this way, a conduction loss of the resonant circuit can be reduced when it is ensured that the power conversion circuit normally implements a function. In addition, when the capacitance value of the resonant capacitor is set to be smaller, occupation of the resonant capacitor on the power conversion circuit and limited space in an electronic device in which the power conversion circuit is located is reduced. This can reduce production costs of the power conversion circuit and the electronic device in which the power conversion circuit is located, when it is ensured that the power conversion circuit normally implements the function.

Figure 16:
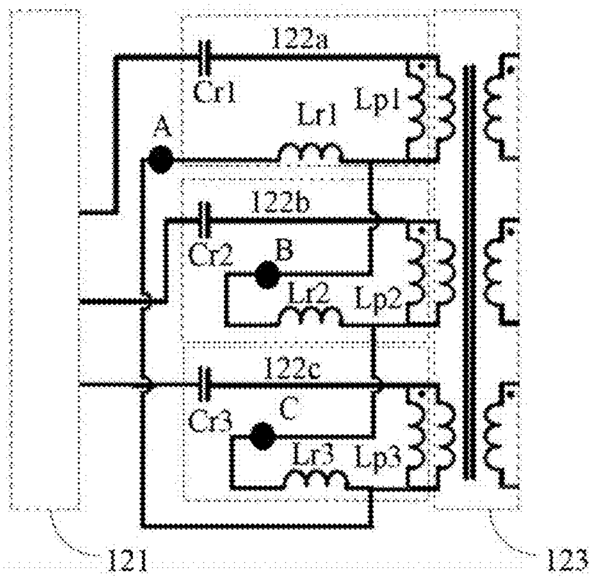
FIG. 16 is a schematic diagram of a structure of Embodiment 5 of a power conversion circuit.

FIG. 16 is a schematic diagram of a structure of Embodiment 5 of a power conversion circuit. FIG. 16 shows an implementation of three resonant circuits in another power conversion circuit. Each resonant circuit shown in FIG. 16 includes a resonant capacitor, an excitation inductor, and a resonant inductor that are connected in series. The first resonant inductor Lr1 in the first resonant circuit 122*a*, the second resonant inductor Lr2 in the second resonant circuit 122*b*, the third resonant inductor Lr3 in the third resonant circuit 122*c* are connected in series, so that resonant inductors in the three resonant circuits jointly form a triangle connection relationship. The three resonant circuits shown in FIG. 16 may be used to perform equivalent replacement on three resonant circuits in the power conversion circuit shown in FIG. 7. In a power conversion circuit obtained through replacement, implementations and principles of a switch conversion circuit, a three-phase transformer, a rectifier circuit, and a filter circuit are the same as those shown in FIG. 7. Details are not described again.

Figure 17:
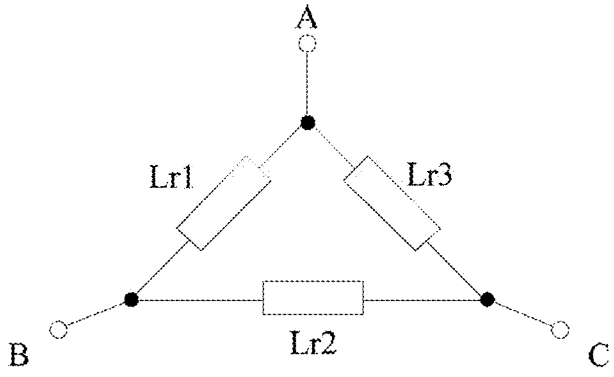
FIG. 17 is a schematic diagram of a triangle connection relationship of Embodiment 5 of a power conversion circuit.

FIG. 17 is a schematic diagram of the triangle connection relationship of Embodiment 5 of the power conversion circuit. With reference to FIG. 16 and FIG. 17, in FIG. 16, a left side of the first resonant inductor Lr1 is denoted as a point A, a left side of the second resonant inductor Lr2 is denoted as a point B, and a left side of the third resonant inductor Lr3 is denoted as a point C. In this case, the first resonant inductor Lr1, the second resonant inductor Lr2, and the third resonant inductor Lr3 are connected in series to form the triangle connection relationship among the point A, the point B, and the point C.

Therefore, when a resonant circuit in the power conversion circuit shown in FIG. 16 is implemented, after resonant inductors in three resonant circuits are connected in a triangle connection manner in FIG. 17, when it is ensured that the resonant circuit shown in FIG. 16 and a resonant circuit in the power conversion circuit shown in FIG. 5 or FIG. 6 provide a same resonant frequency, through star-triangle conversion, current stress of the resonant inductor in each resonant circuit in FIG. 16 is reduced to $$\frac{1}{\sqrt{3}}$$

of that in FIG. 5 or FIG. 6 when the resonant inductor in each resonant circuit provides a resonance, so that production costs can be reduced when it is ensured that the power conversion circuit normally implements a function.

The embodiments may further provide an electronic device, including the power conversion circuit. The embodiments may further provide an application of the power conversion circuit in the electronic device. A structure of the electronic device may be shown in FIG. 1A and FIG. 1B or FIG. 2. Details are not described again. In some embodiments, the electronic device is configured to perform voltage conversion using a planar transformer. The electronic device may be a device that needs to process a voltage, such as a rectifier, a charging pile, and a communication power supply.

Some embodiments may further provide an electronic device. The electronic device may include a rectifier module, a filter module, a power factor correction (PFC) module, and a power conversion module that are sequentially connected. The rectifier module is configured to: obtain an alternating current input from outside of the electronic device and rectify the alternating current to obtain a direct current. The filter module is configured to filter the direct current processed by the rectifier module. The PFC module is configured to perform power factor correction on a direct current processed by the filter module. Then, the power conversion module performs voltage conversion on a direct current processed by the PFC module, and outputs the direct current to a subsequent load. In this process, the power conversion module in the electronic device implements a function of converting a voltage of the direct current. When the power conversion module includes at least one resonant circuit including two inductors (L) and one capacitor (C), the power conversion module disposed in the electronic device may also be an LLC voltage conversion circuit, an LLC converter, or the like. If the electronic device 1 shown in FIG. 1A or FIG. 1B is used as an example, circuits of the rectifier module, the filter module, and the PFC module in this embodiment may be sequentially connected and form the power input circuit 11. The power conversion module may be the power conversion circuit 12.

It should be noted that the foregoing embodiments are merely intended for describing rather than limiting the embodiments. Although described in detail with reference to the foregoing embodiments, persons of ordinary skill in the art should understand that they may still make modifications to the solutions described in the foregoing embodiments or make equivalent replacements to some or all features thereof, without departing from the scope of the solutions of the embodiments.

What is claimed is:

1. A power conversion circuit, comprising:
- a switch conversion circuit;
- three resonant circuits;
- a three-phase transformer;
- a rectifier circuit; and
- a filter circuit, wherein the switch conversion circuit, the three resonant circuits, the three-phase transformer, the rectifier circuit, and the filter circuit are sequentially connected, each resonant circuit is disposed between the switch conversion circuit and the three-phase transformer and each resonant circuit comprises:
- a resonant capacitor,
- a resonant inductor, and
- an excitation inductor, wherein
- the excitation inductor and the resonant capacitor in each resonant circuit are connected in series to form a first circuit unit, three first circuit units in the three resonant circuits are connected in series;
- the resonant capacitor, the resonant inductor, and the excitation inductor in each resonant circuit are connected in series to form a second circuit unit, and three second circuit units in the three resonant circuits are connected in series;
- the resonant inductor and the excitation inductor in each resonant circuit are connected in series to form a third circuit unit, and three third circuit units in the three resonant circuits are connected in series;
- the resonant capacitor and the resonant inductor in each resonant circuit are connected in series to form a fourth circuit unit, and either three fourth circuit units in the three resonant circuits are connected in series or resonant inductors in the three resonant circuits are connected in series;
- wherein the three first circuit units, the three second circuit units, the three third circuit units, or the three fourth circuit units that are connected in series form a triangle connection relationship, so that resonant capacitors and/or resonant inductors in the three resonant circuits jointly provide a resonance for each resonant circuit through star-triangle conversion.

2. The power conversion circuit according to claim 1, wherein the three resonant circuits comprise:
- a first resonant circuit comprising a first resonant capacitor, a first resonant inductor, and a first excitation inductor;
- a second resonant circuit comprising a second resonant capacitor, a second resonant inductor, and a second excitation inductor; and
- a third resonant circuit comprising
- a third resonant capacitor, a third resonant inductor, and a third excitation inductor.

3. The power conversion circuit according to claim 2, wherein, in each resonant circuit, the resonant inductor, the excitation inductor, and the resonant capacitor are connected in series and the first excitation inductor, the first resonant capacitor, the second excitation inductor, the second resonant capacitor, the third excitation inductor, and the third resonant capacitor are connected in series.

4. The power conversion circuit according to claim 2, wherein, in each resonant circuit, the resonant capacitor, the resonant inductor, and the excitation inductor are connected in series; and the first resonant capacitor, the first resonant inductor, the first excitation inductor, the second resonant capacitor, the second resonant inductor, the second excitation inductor, the third resonant capacitor, the third resonant inductor, and the third excitation inductor are connected in series.

5. The power conversion circuit according to claim 2, wherein, in each resonant circuit, the resonant capacitor, the resonant inductor, and the excitation inductor are connected in series; and the first resonant inductor, the first excitation inductor, the second resonant inductor, the second excitation inductor, the third resonant inductor, and the third excitation inductor are connected in series.

6. The power conversion circuit according to claim 2, wherein, in each resonant circuit, the excitation inductor, the resonant inductor, and the resonant capacitor are connected in series; and the first resonant capacitor, the first resonant inductor, the second resonant capacitor, the second resonant inductor, the third resonant capacitor, and the third resonant inductor are connected in series.

7. The power conversion circuit according to claim 2, wherein, in each resonant circuit, the resonant capacitor, the excitation inductor, and the resonant inductor are connected in series; and the first resonant inductor, the second resonant inductor, and the third resonant inductor are connected in series.

8. The power conversion circuit according to claim 2, wherein capacitance values of the first resonant capacitor, the second resonant capacitor, and the third resonant capacitor are equal; inductance values of the first resonant inductor, the second resonant inductor, and the third resonant inductor are equal; and inductance values of the first excitation inductor, the second excitation inductor, and the third excitation inductor are equal.

9. An electronic device, comprising:

a rectifier module, a filter module, a power factor correction (PFC) module, and a power conversion module, wherein the power conversion module comprises a power conversion circuit; wherein the power conversion circuit comprises:

a switch conversion circuit, three resonant circuits, a three-phase transformer, a rectifier circuit, and a filter circuit, wherein the switch conversion circuit, the three resonant circuits, the three-phase transformer, the rectifier circuit, and the filter circuit are sequentially connected, each resonant circuit is disposed between the switch conversion circuit and the three-phase transformer and each resonant circuit comprises:

a resonant capacitor, a resonant inductor, and an excitation inductor; wherein the excitation inductor and the resonant capacitor in each resonant circuit are connected in series to form a first circuit unit, and three first circuit units in the three resonant circuits are connected in series;

the resonant capacitor, the resonant inductor, and the excitation inductor in each resonant circuit are connected in series to form a second circuit unit, and three second circuit units in the three resonant circuits are connected in series;

the resonant inductor and the excitation inductor in each resonant circuit are connected in series to form a third circuit unit, and three third circuit units in the three resonant circuits are connected in series;

the resonant capacitor and the resonant inductor in each resonant circuit are connected in series to form a fourth circuit unit, and either three fourth circuit units in the three resonant circuits are connected in series or resonant inductors in the three resonant circuits are connected in series;

wherein the three first circuit units, the three second circuit units, the three third circuit units, or the three fourth circuit units that are connected in series form a triangle connection relationship, so that resonant capacitors and/or resonant inductors in the three resonant circuits jointly provide a resonance for each resonant circuit through star-triangle conversion; and wherein the rectifier module is configured to rectify an alternating current input into the electronic device to obtain a direct current, the filter module is configured to filter the direct current processed by the rectifier module, the PFC module is configured to perform power factor correction on the direct current processed by the filter module, and the power conversion module is configured to perform voltage conversion on the direct current processed by the PFC module and output the direct current.

10. The electronic device according to claim 9, wherein the three resonant circuits comprise:

a first resonant circuit comprising a first resonant capacitor, a first resonant inductor, and a first excitation inductor;

a second resonant circuit comprising a second resonant capacitor, a second resonant inductor, and a second excitation inductor; and a third resonant circuit comprising a third resonant capacitor, a third resonant inductor, and a third excitation inductor.

11. The electronic device according to claim 10, wherein, in each resonant circuit, the resonant inductor, the excitation inductor, and the resonant capacitor are connected in series; and the first excitation inductor, the first resonant capacitor, the second excitation inductor, the second resonant capacitor, the third excitation inductor, and the third resonant capacitor are connected in series.

12. The electronic device according to claim 10, wherein, in each resonant circuit, the resonant capacitor, the resonant inductor, and the excitation inductor are connected in series; and the first resonant capacitor, the first resonant inductor, the first excitation inductor, the second resonant capacitor, the second resonant inductor, the second excitation inductor, the third resonant capacitor, the third resonant inductor, and the third excitation inductor are connected in series.

13. The electronic device according to claim 10, wherein, in each resonant circuit, the resonant capacitor, the resonant inductor, and the excitation inductor are connected in series; and the first resonant inductor, the first excitation inductor, the second resonant inductor, the second excitation inductor, the third resonant inductor, and the third excitation inductor are connected in series.

14. The electronic device according to claim 10, wherein, in each resonant circuit, the excitation inductor, the resonant inductor, and the resonant capacitor are connected in series; and the first resonant capacitor, the first resonant inductor, the second resonant capacitor, the second resonant inductor, the third resonant capacitor, and the third resonant inductor are connected in series.

15. The electronic device according to claim 10, wherein, in each resonant circuit, the resonant capacitor, the excitation inductor, and the resonant inductor are connected in series; and the first resonant inductor, the second resonant inductor, and the third resonant inductor are connected in series.

16. The electronic device according to claim 10, wherein capacitance values of the first resonant capacitor, the second resonant capacitor, and the third resonant capacitor are equal; inductance values of the first resonant inductor, the second resonant inductor, and the third resonant inductor are equal; and inductance values of the first excitation inductor, the second excitation inductor, and the third excitation inductor are equal.

17. The electronic device according to claim 9, further comprising:

a rectifier;

a charging pile; and a communication device.

18. The electronic device of claim 9, wherein the electronic device is configured to supply power to a processor or a transceiver.

19. The electronic device of claim 9, wherein the electronic device is configured to supply power to an electric vehicle.

20. The electronic device of claim 9, wherein the electronic device is configured to convert an alternating current into a direct current.

* * * * *